United States Patent [19]

Perach et al.

[11] Patent Number: 5,520,490
[45] Date of Patent: May 28, 1996

[54] RETAINER CLIP

[75] Inventors: Asi Perach, Farmington Hills; Michael D. Morelli, Sterling Heights; Douglas S. Ostrander, Yale, all of Mich.

[73] Assignee: General Motors Corporation, Detroit, Mich.

[21] Appl. No.: 428,967

[22] Filed: Apr. 26, 1995

[51] Int. Cl.⁶ .............................. F16B 21/18; F16B 9/00; B25G 3/00
[52] U.S. Cl. .................... 411/353; 411/517; 411/519; 403/259; 470/41
[58] Field of Search .................................. 411/200, 352, 411/353, 517, 518, 519, 522; 403/257, 259, 254; 470/41; 29/172

[56] References Cited

U.S. PATENT DOCUMENTS

| | | | |
|---|---|---|---|
| 3,414,154 | 12/1968 | Rose et al. | 411/353 |
| 3,796,124 | 3/1974 | Crosa . | |
| 4,729,706 | 3/1988 | Peterson et al. . | |
| 4,775,273 | 10/1988 | Bauer . | |
| 4,778,321 | 10/1988 | Okawa . | |
| 5,026,233 | 6/1991 | Carothers | 411/353 X |

FOREIGN PATENT DOCUMENTS

| | | | |
|---|---|---|---|
| 1269551 | 5/1990 | Canada | 411/519 |
| 2358479 | 6/1975 | Germany | 411/517 |
| 3400146 | 7/1985 | Germany | 411/353 |
| 429211 | 1/1949 | Italy | 411/517 |
| 956937 | 4/1964 | United Kingdom . | |

*Primary Examiner*—Neill R. Wilson
*Attorney, Agent, or Firm*—Kathryn A. Marra

[57] ABSTRACT

A retainer clip includes a retainer portion having an axially extending tubular wall which is radially expandable for snap-fitted radial engagement with a reduced diameter portion of a rod such that the retainer clip is radially and axially trapped on the reduced diameter portion of the rod and can only be removed by simultaneous application of dual directional forces. The retainer clip includes the retainer portion, a washer portion, and a hinge portion integrally connecting the retainer portion and the washer portion so that the retainer clip is handled as a single part during assembly onto the rod.

19 Claims, 5 Drawing Sheets

RETAINER CLIP

This invention relates to a retainer clip for attachment to a rod having a reduced diameter portion.

BACKGROUND OF THE INVENTION

It is well known to provide a rod and retainer clip assembly including a rod and a retainer clip which is snapped onto the end of the rod. Such retainer clips are useful, for example, in a brake pedal assembly in a vehicle. The retainer clip axially retains the rod in place and axially retains a component, such as a brake adjust switch assembly, on the rod. The retainer clip must allow the rod to operate freely without engaging any surrounding objects. Typically, the rod includes an annular groove and the retainer clip includes holes, fingers or projections whose edges engage the annular groove to retain the clip on the rod.

An example of a prior art rod and retainer clip assembly 10 including a rod 12, a retainer clip 20, and a brake adjust switch assembly 30 axially retained on the rod 12 is shown in FIGS. 1 and 2. The rod 12 includes a rod end portion 14 and an enlarged diameter portion 16 being spaced apart axially inward from the rod end portion 14. An annular groove 18 is located between the rod end portion 14 and the enlarged diameter portion 16. The prior art retainer clip 20 is made of a single piece of resilient material and includes a first generally rectangular planar portion 22 and a second generally rectangular planar portion 24 connected by a bent U-shaped portion 26. A pair of flexible spring legs 28 extend from the U-shaped portion 26 for flexible engagement with the switch assembly 30. The second planar portion 24 includes a key-shaped hole 32 therethrough having an upper opening 34 having a width sized for closely surrounding the annular groove 18 on the rod 12. The first planar portion 22 includes a flexible tongue 36 extending therefrom and having a J-shaped hooked end 38 bent towards the second planar portion 24 such that a free tip 40 of the hooked end 38 is planar with the second planar portion 24. The retainer clip 20 is assembled to the rod 12 by axially aligning the rod 12 with the key-shaped hole 32 and pushing the retainer clip 20 axially inward onto the rod 12 such that the J-shaped hooked end 38 flexes to permit assembly of the retainer clip 20 onto the rod 12 until the free tip 40 of the hooked end 38 snaps into the annular groove 18 of the rod 12. In the assembled condition, the upper opening 34 of the key-shaped hole 32 and the free tip 40 of the hooked end 38 each have edges which engage the annular groove 18 to hold the retainer clip 20 on the rod 12.

This and other typical prior art retainer clips are designed to be held on the rod by contact of the edges of a hole or the edges of flexible projections or fingers with an annular groove on the rod. These edges do not apply any significant inward radial load on the rod. Thus, these retainer clips may rotate relative the rod and may be removed from the rod by application of an axial force on the retainer clip. In addition, the corners and square shape of the illustrated prior art retainer clip take up extra space in the instrument panel area.

SUMMARY OF THE INVENTION

This invention provides an improved retainer clip including a retainer portion having a tubular wall which is radially expandable for snap-fitted radial engagement with a reduced diameter portion of a rod such that the retainer clip is radially and axially trapped on a reduced diameter portion of the rod and can only be removed by simultaneous application of dual directional forces. Advantageously, the tubular wall continually applies concentric radial forces on the reduced diameter portion rod to radially trap the retainer clip on the rod and prevent rotation of the retainer clip relative the rod.

A retainer clip according to the present invention is attachable to a rod having an axially outward rod end and a reduced diameter portion axially inward the rod end. The retainer clip includes a retainer portion, a washer portion, and a hinge portion integrally connecting the retainer portion and the washer portion so that the retainer clip is handled as a single part during assembly onto the rod.

The retainer portion includes an axially extending tubular wall including an inner surface defining an axially extending passageway which is sized smaller than the reduced diameter portion of the rod when the retainer portion is in a relaxed condition separate from the rod. The wall includes an axially extending slit permitting radial expansion of the wall for snap-fitted radial engagement of the inner surface of the wall around the reduced diameter portion of the rod when the retainer clip is assembled to the rod. The wall has an axial wall length less than an axial rod length of the reduced diameter portion of the rod such that the retainer portion is axially trapped on the reduced diameter portion of the rod when assembled to the rod.

The washer portion of the retainer clip is positioned axially inward the retainer portion and has a hole which is axially aligned with the passageway of the tubular wall and is sized for receiving the rod end and the reduced diameter portion of the rod therethrough.

Removal of the retainer clip from the rod requires simultaneous radial expansion of the wall and outward axial movement of the retainer clip. Thus, axial removal of the retainer clip from the rod during normal use of the retainer clip is prevented, while permitting serviceability. Advantageously, the inner surface of the tubular wall applies concentric inward radial forces against the reduced diameter portion of the rod to provide surface to surface contact that provides greater retention of the retainer clip on the rod as compared to the edge or finger type contact of the prior art clips.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
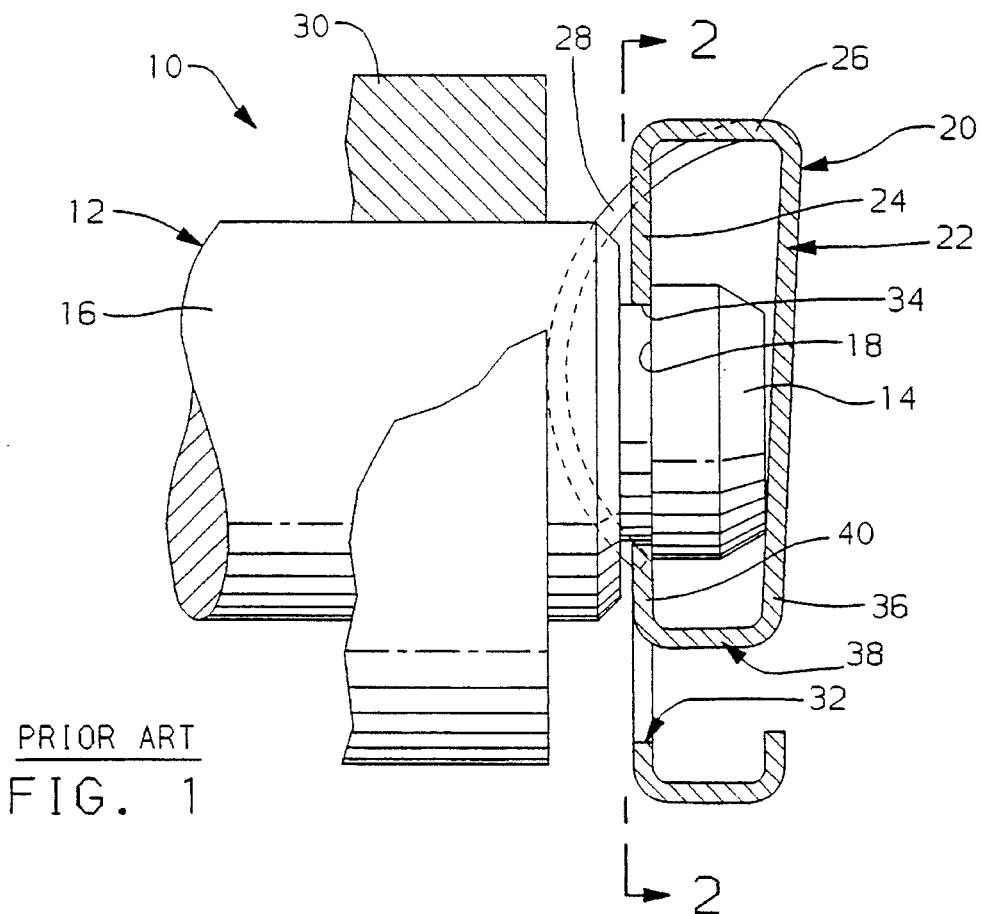
FIG. 1 is a side view of a prior art rod and retainer clip assembly showing a rod and a brake adjust switch assembly on the rod partially-broken-away and showing a cross-sectional view of the prior art retainer clip.
Figure 2:
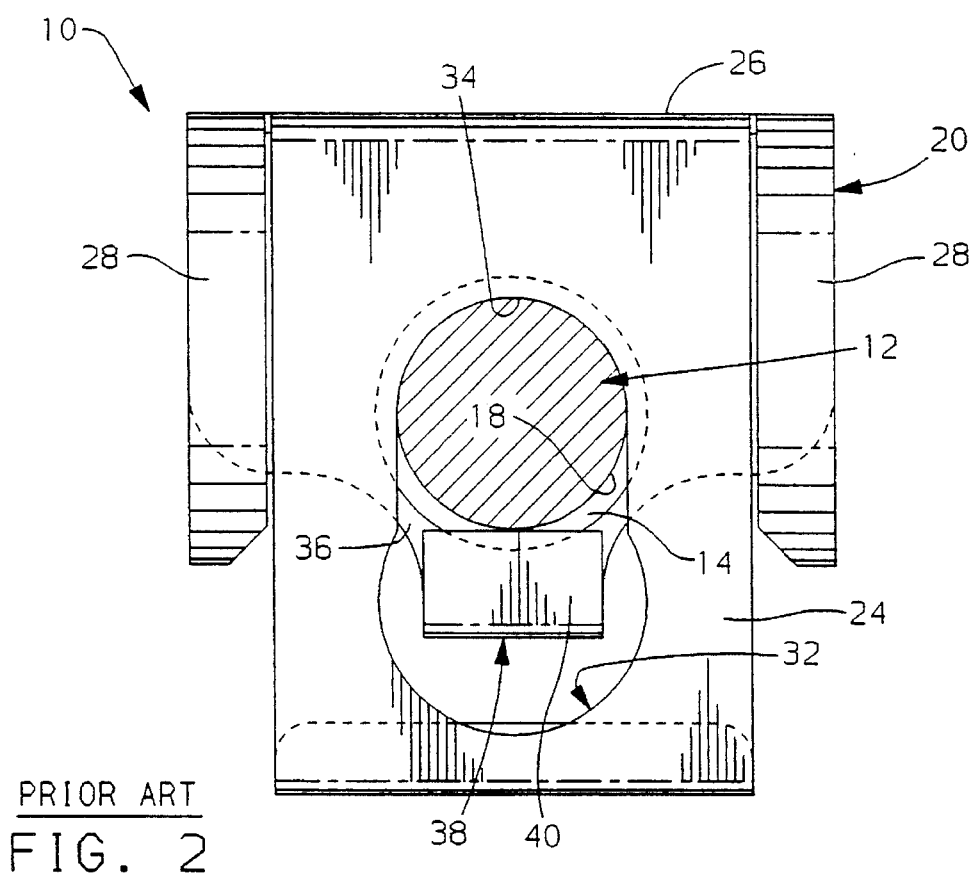
FIG. 2 is a prior art view taken along line 2—2 of FIG. 1.
Figure 3:
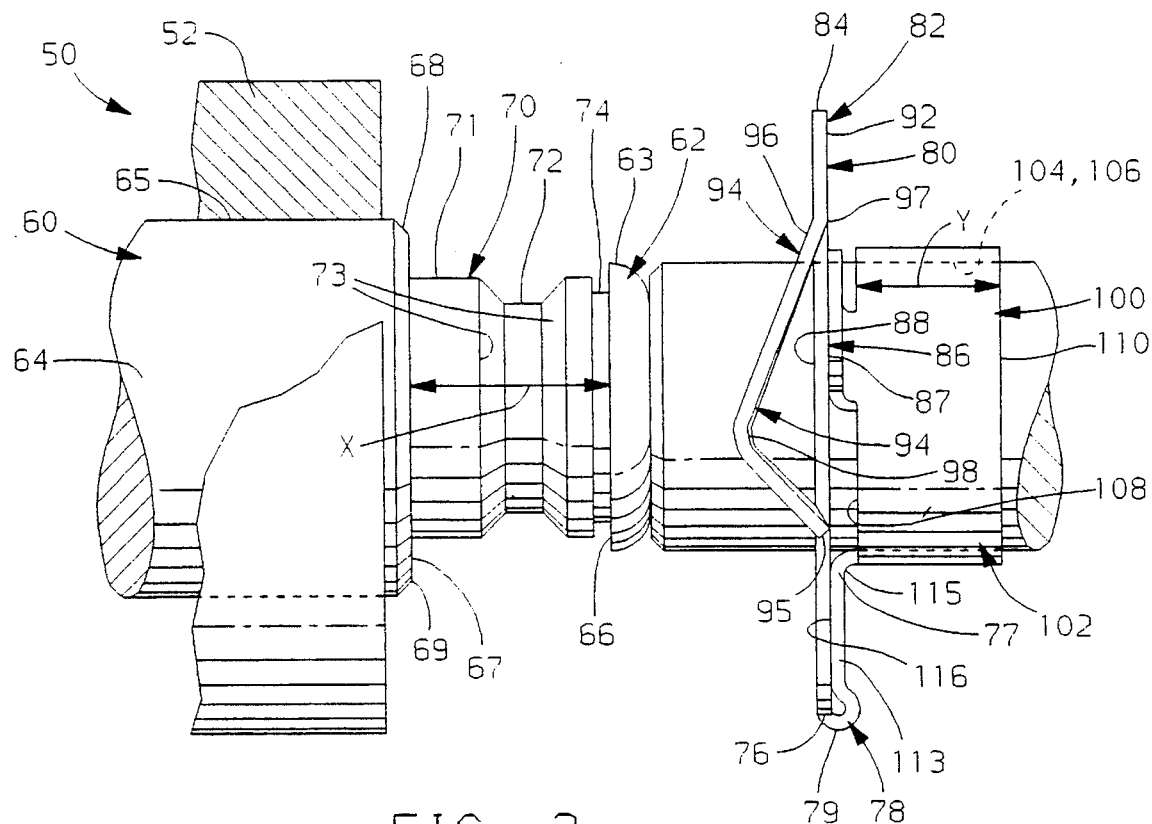
FIG. 3 is a side view of a preferred embodiment of rod and retainer clip assembly according to the present invention showing a retainer clip on a tool prior to assembly to the rod and showing the rod and a brake adjust switch assembly on the rod partially-broken-away.
Figure 4:
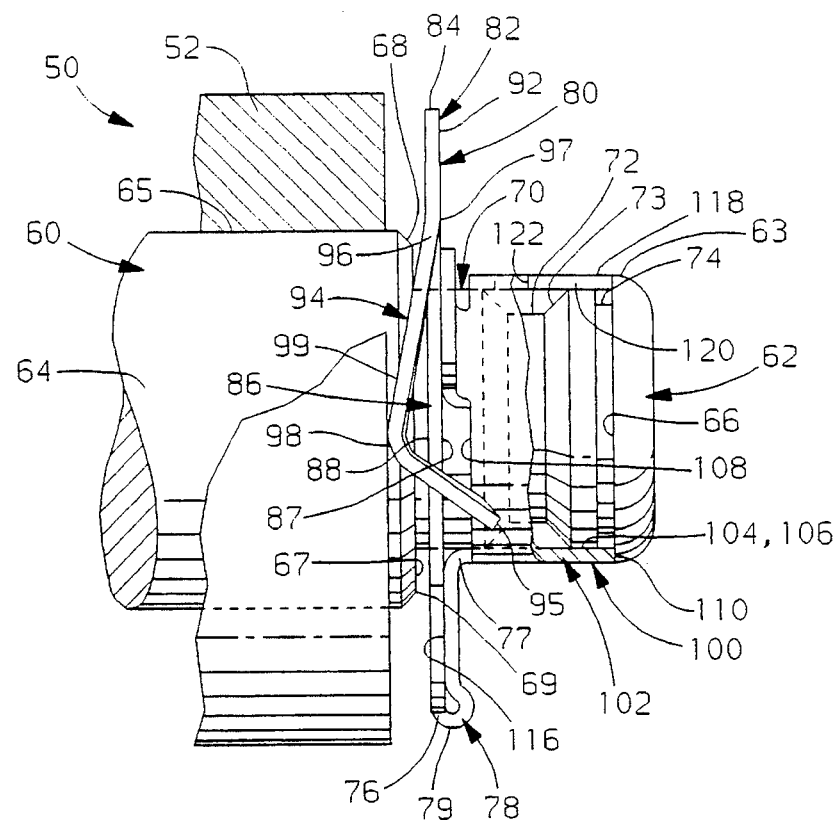
FIG. 4 is a view similar to FIG. 3, but showing the retainer clip fully assembled on the rod.

Referring to FIGS. 3 and 4, a rod and retainer clip assembly 50 includes a cylindrical rod 60, a retainer clip 80, and a component 52 axially retained on the rod 60 by the retainer clip 80. In the preferred embodiment, the rod and retainer clip assembly 50 is part of a vehicle brake pedal assembly and the component is a brake adjust switch assembly 52 axially retained on the rod 60 by the retainer clip 80. Preferably, the switch assembly 52 is axially positioned between the retainer clip 80 and an axially inward fixed collar (not shown) on the rod 60 such that the switch assembly 52 is maintained in a fixed axial position on the rod 60.

Referring to FIG. 3, the cylindrical rod 60 is preferably machined from a metallic material. The rod 60 includes an axially outward rod end portion 62 which is preferably dome-shaped for permitting smooth axial assembly of the retainer clip 80 over the rod end portion 62 and onto the rod 60, as will be described further hereinafter. The rod 60 includes an enlarged diameter portion 64 spaced apart axially inward from the rod end portion 62 and having an outer enlarged diameter 65 being equal to or greater than an outer end diameter 63 of the rod end portion 62. The rod 60 further includes a reduced diameter portion 70 which has an axial rod length X which axially extends between the rod end portion 62 and the enlarged diameter portion 64 of the rod 60. The reduced diameter portion 70 of the rod 60 has an outer reduced diameter 71 which is smaller than the end diameter 63 of the rod end portion 62 and the enlarged diameter 65 of the enlarged diameter portion 64. The reduced diameter portion 70 preferably includes a first annular groove 72 thereon including opposing cam surfaces 73 for assisting with disassembly of the retainer clip 80 from the rod 60, as will be described further hereinafter. In addition, the reduced diameter portion 70 of the rod 60 may optionally include a second annular groove 74 thereon proximate the rod end portion 62 of the rod 60. The annular groove 74 guarantees a flat first abutment surface 66 on the rod 60 for engaging a second circumferential edge 110 of the retainer clip 80 to assist with trapping the retainer clip 80 on the rod 60, as described further hereinafter.

As best shown in FIG. 3, the rod 60 includes axially spaced apart and opposing first and second abutment surfaces 66, 67 which face each other and are located adjacent the reduced diameter portion 70 of the rod 60 on the rod end portion 62 and the enlarged diameter portion 64, respectively. The first and second abutment surfaces 66, 67 each extend radially outward from opposite ends of the reduced diameter portion 70 of the rod 60 to trap the retainer clip 80 therebetween, as described below. A chamfered annular surface 68 may be included on the enlarged diameter portion 64 to assist with smooth assembly of the switch assembly 52 onto the enlarged diameter portion 64 of the rod 60.

Figure 5:
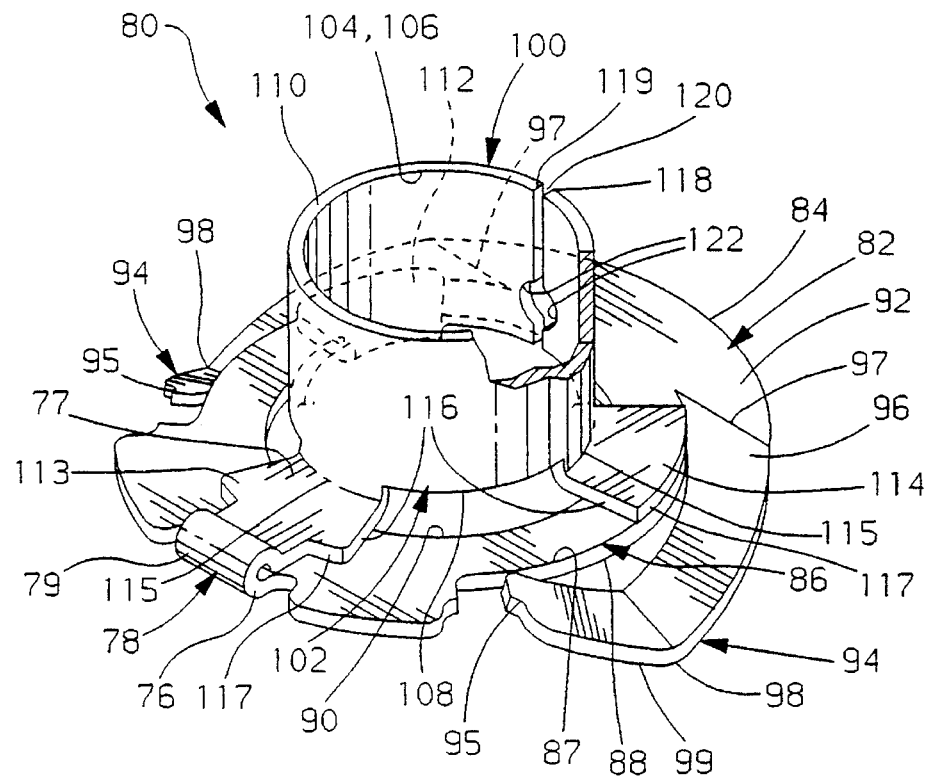
FIG. 5 is a perspective view of the retainer clip partially-broken-away.
Figure 6:
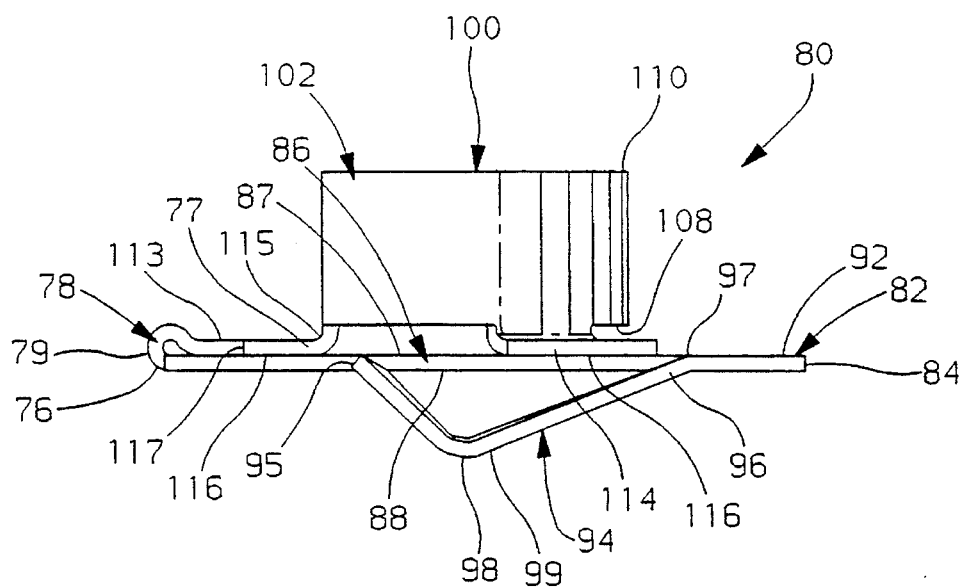
FIG. 6 is a side view of the retainer clip.
Figure 7:
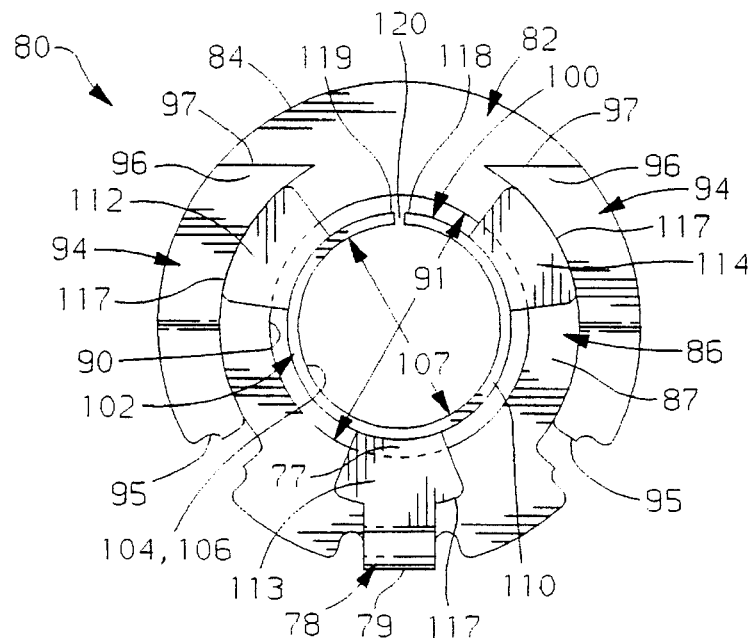
FIG. 7 is a top view of the retainer clip.

Referring to FIGS. 5, 6 and 7, the retainer clip 80 includes a generally cylindrical washer portion 82 and a generally cylindrical retainer portion 100 which are integrally joined together by an umbilical hinge portion 78. The retainer portion 100 and the washer portion 82 are joined by the hinge portion 78 to advantageously be handled as a single part during assembly to the rod 60. The entire retainer clip 80 is preferably formed by bending and stamping a single flat blank 150 of resilient material shown in FIG. 8, as described further below.

As best shown in FIG. 5, the washer portion 82 of the retainer clip 80 extends radially outward and includes a generally circular outer perimeter 84. The washer portion 82 includes a generally flat circular inner portion 86 having a first surface 87 and an opposite second surface 88. The inner portion 86 of the washer portion 82 includes a hole 90 therethrough having a hole diameter 91 which is sized larger than the end diameter 63 and the reduced diameter 71, but smaller than the enlarged diameter 65 and a diameter 69 of the second abutment surface 67.

The washer portion 82 has a generally cylindrical radially outward outer peripheral portion 92 including a plurality of flexible spring legs 94 which extend axially inward from the outer peripheral portion 92 of the washer portion 82. The flexible spring legs 94 each have a free end 95 and a tip 96 opposite the free end 95 with the tips 96 being integrally connected to the outer peripheral portion 92 of the washer portion 82. Each tip 96 includes a tip line bend 97 in a direction away from the second surface 88 of the inner portion 86 and each flexible spring leg 94 includes an intermediate line bend 98 back towards the second surface 88 of the inner portion 86. Thus, the line bends 97, 98 on the spring legs 94 cooperatively form a convex surface 99 on each of the flexible spring legs 94 for resiliently engaging the switch assembly 52 as best shown in FIG. 4, without interfering with or damaging the switch assembly 52. In addition, the free ends 95 of the spring legs 94 are bent to be near the second surface 88 of the washer portion 82 to allow free movement of the spring legs 94 yet prevent the spring legs 94 of the retainer clip 80 from becoming entangled with similar retainer clips 80 during shipping.

The retainer clip 80 also includes a retainer portion 100 for radially and axially retaining the retainer clip 80 to the rod 60. The retainer portion 100 has an axially extending tubular wall 102 including an axially extending inner surface 104 which forms an axially extending passageway 106. The passageway 106 of the tubular wall 102 of the retainer portion 100 is axially aligned with the hole 90 in the inner portion 86 of the washer portion 82. In a relaxed condition unassembled to the rod 60 shown in FIGS. 5–7, the inner surface 104 of the tubular wall 102 has a passageway diameter 107 being less than the reduced diameter 71 of the reduced diameter portion 70 of the rod 60. Also, the tubular wall 102 of the retainer portion 100 has an axial wall length Y which is slightly less than the axial rod length X of the reduced diameter portion 70 of the rod 60 such that the tubular wall 102 of the retainer portion 100 is axially captured in the reduced diameter portion 70. The tubular wall 102 of the retainer portion 100 includes an axially inward first circumferential edge 108 proximate the first surface 87 of the inner portion 86 of the washer portion 82 and an opposite second circumferential edge 110.

The retainer portion 100 of the retainer clip 80 further includes a plurality of integral bent tabs 112, 113, 114 extending radially outward from the first circumferential edge 108 of the tubular wall 102. The tabs 112, 113, 114 are each bent 90 degrees at a radially inward edge 115 integrally connected to the tubular wall 102 and each have a radially outward edge 117 shaped to follow the outer curvature of the inner portion 86 of the washer portion 82. As best shown in FIGS. 5 and 7, the tabs 112, 113, 114 preferably have a trapezoidal shape becoming wider in a radially outward direction. This trapezoidal shape of the tabs 112, 113, 114 prevents stress concentrations on the inward radial edge 115, makes the tubular wall 102 easier to form, and helps to maintain the tubular wall 102 in a cylindrical shape. As best shown in FIGS. 5 and 6, the tabs 112, 113, 114 each have a mating surface 116 which engages the first surface 87 of the inner portion 86 of the washer portion 82 to position the retainer portion 100 relative the washer portion 82 and to prevent axial movement of the inner portion 86 of the washer portion 82 towards the retainer portion 100 during assembly of the retainer clip 80 onto the rod 60 and upon engagement of the flexible spring legs 94 with the brake switch assembly 52.

The tubular wall 102 of the retainer portion 100 further includes first and second axial edges 118, 119 cooperatively defining an axially extending slit 120 along the entire axial wall length Y of the tubular wall 102 to enable radial expansion of the tubular wall 102 during assembly. As shown in FIG. 5, the tubular wall 102 of the retainer portion 100 further includes a pair of matably aligned semicircular wall grooves 122 adjacent the slit 120. The wall grooves 122 are preferably positioned directly radially outward from the first annular groove 72 on the rod 60 when the retainer clip 80 is fully assembled on the rod 60 as shown in FIG. 4. The slit 120 and wall grooves 122 assist with assembly and disassembly of the retainer clip 80 to the rod 60, as will be described further hereinafter.

The retainer clip 80 also includes a hinge portion 78 integrally interconnecting the washer portion 82 and the retainer portion 100. Preferably, the hinge portion 78 is a thin flat strip of material having a first end 76 connected to the washer portion 82 and an opposite second end 77 connected to the retainer portion 100, preferably at the central tab 113. The hinge portion 78 includes a 180 degree intermediate hinge bend 79 in a direction towards the first surface 87 of the inner portion 86 of the washer portion 82 such that the hinge portion 78 overlaps onto itself. The bent hinge portion 78 and the bent tabs 112, 113, 114 of the retainer portion 100 cooperatively position the passageway 106 of the tubular wall 102 in axial alignment with the hole 90 of the washer portion 82.

Figure 8:
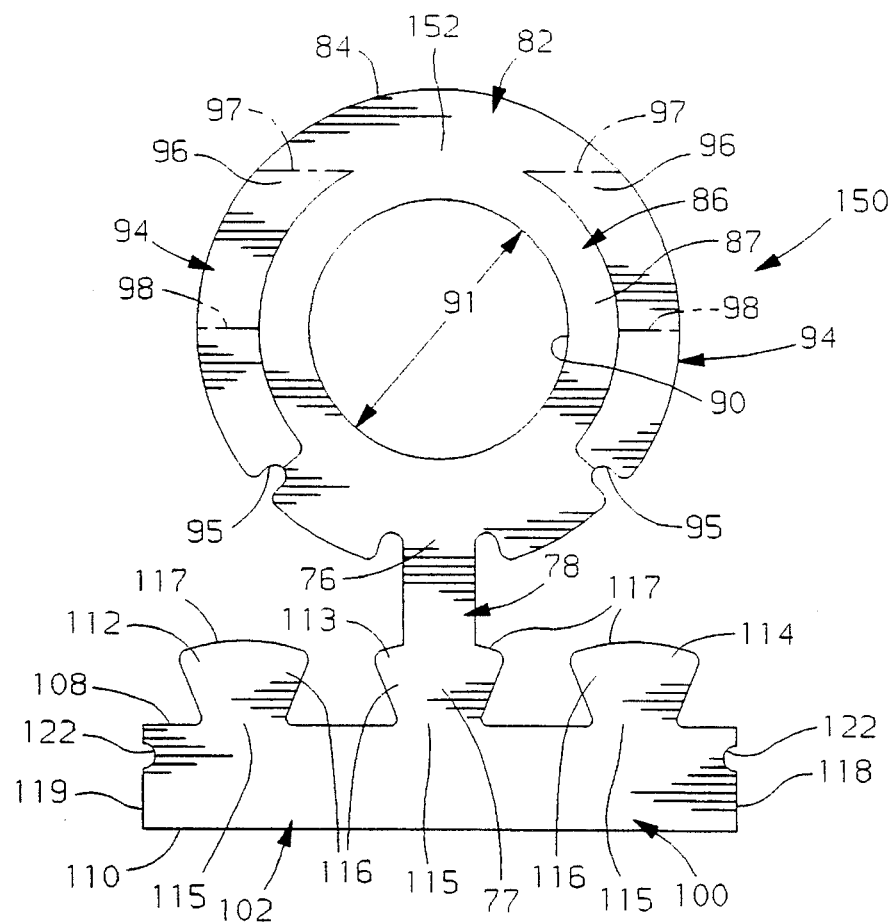
FIG. 8 is a view of a blank from which the retainer clip is formed.

Referring to FIG. 8, the retainer clip 80 is formed in the following manner by bending and stamping a single integral flat blank 150 of resilient spring-like material, preferably being steel having a thickness of approximately 0.5 mm. The blank 150 includes a first blank surface 152 and an opposite second blank surface (not shown in FIG. 8) corresponding to the first and second surfaces 87, 88 of the inner portion 86 of the washer portion 82, respectively. First, the blank 150 is suitably stamped to form the outer perimeter 84 of the washer portion 82, a longitudinally elongate strip being the tubular wall 102 of the retainer portion 100 including the plurality of tabs 112, 113, 114 extending from the tubular wall 102 towards the washer portion 82, and the hinge portion 78 extending between the center tab 113 of the elongate strip being the tubular wall 102 and the outer perimeter 84 of the washer portion 82. Additionally, the inner portion 86 of the washer portion 82 is stamped to form the hole 90 and the outer peripheral portion 92 of the washer portion 82 is stamped to form the flexible spring legs 94. Each spring leg 94 is bent away from the second blank surface 154 to form the tip line bend 97 and also bent back towards the second blank surface 154 at an intermediate location to form the intermediate line bend 98.

The retainer portion 100 of the retainer clip 80 is formed as follows. The tubular wall 102 is formed by bending the elongate strip into a tubular shape such that the first blank surface 152 of the blank 150 becomes the inner surface 104 of the tubular wall 102. Also, the first and second axial edges 118, 119 and the semicircular wall grooves 122 are matably aligned to form the slit 120 in the tubular wall 102. The tabs 112, 113, 114 are each bent along the inward radial edge 115 connected to the first circumferential edge 108 of the tubular wall 102 substantially 90 degrees towards the second blank surface such that the tabs 112, 113, 114 extend at a 90 degree angle outward from the tubular wall 102.

The hinge portion 78 is bent substantially 180 degrees at an intermediate portion thereof towards the first surface 87 of the inner portion 86 of the washer portion 82 such that the hinge portion 78 is overlapped onto itself as best shown in FIGS. 5 and 6. Simultaneous with forming the hinge bend 79, the mating surfaces 116 of the tabs 112, 113, 114 engage the first surface 87 of the inner portion 86 of the washer portion 82 and the passageway 106 of the tubular wall 102 becomes axially aligned with the hole 90 of the washer portion 82. It will be appreciated that the bending and stamping of the blank may done in a variety of suitable orders to form the retainer clip 80, and is not intended to be limited to the order shown above.

The retainer clip 80 formed from the blank 150 is assembled to the rod 60 as follows. After assembling of the switch assembly 52 onto the rod 60, the hole 90 of the inner portion 86 of the washer portion 82 and the passageway 106 of the retainer portion 100 are axially aligned with the rod end portion 62 of the rod 60 with the washer portion 82 leading. Next the retainer clip 80 is easily pushed axially inward over the rod end portion 62 of the rod 60 as permitted by the dome shape of the rod end portion 62 and the outward radial expansion of the tubular wall 102 of the retainer portion 100 as enabled by the axial slit 120. While this snap-on assembly is easily accomplished manually, for repetitive and faster assembly applications, a suitable socket type tool may be used to radially expand the passageway 106 when pushing the retainer clip 80 onto the rod 60. FIG. 3 shows an example of such a tool 130 being used for assembly of the retainer clip 80 to the rod 60.

The retainer clip 80 is pushed axially inward until the tubular wall 102 of the retainer portion 100 resiliently springs radially inward such that the inner surface 104 of the tubular wall 102 snap-fittedly radially engages the reduced diameter portion 70 of the rod 60. During assembly of the retainer clip 80 onto the rod 60, the second surface 88 of the inner portion 86 of the washer portion 82 engages the second abutment surface 67 of the enlarged diameter portion 64 to restrict further inward axial movement of the retainer clip 80 onto the rod 60 such that the retainer clip 80 is seated in the proper axial location on the rod 60. Complete assembly of the retainer clip 80 onto the rod 60 is easily assured by visual or tactile inspection.

The rod and retainer clip assembly 50 is shown in the fully assembled condition in FIG. 4. Since the inner surface 104 defining the passageway 106 of the tubular wall 102 has a passageway diameter 107 sized smaller than the reduced diameter 71 of the reduced diameter portion 70 of the rod 60, the inner surface 104 of the tubular wall 102 constantly applies concentric inward radial forces on the reduced diameter portion 70 of the rod 60 to provide a friction interference fit that radially retains the retainer clip 80 on the rod 60 and prevents unaided rotation of the retainer clip 80 relative to the rod 60. Also in the fully assembled condition, the tubular wall 102 of the retainer clip 80 having an axial wall length Y less than the axial rod length X is axially trapped on the reduced diameter portion 70 of the rod 60 between the first and second abutment surfaces 66, 67 of the rod 60 such that axial removal of the retainer clip 80 and the switch assembly 52 is prevented. Preferably, the switch assembly 52 is axially positioned between the retainer clip 80 and an axially inward fixed collar (not shown) on the rod 60 such that the switch assembly 52 is in a fixed axial position on the rod 60. Also in the assembled condition, the convex surfaces 99 of the flexible spring legs 94 engage the switch assembly 52 to eliminate any axial gap in the assembly 50 and to prevent rattle and vibration of the switch assembly 52 on the rod 60.

It will be appreciated that the snap-fitted radial interference fit between the inner surface 104 of the tubular wall 102 and the reduced diameter portion 70 provides surface to surface contact that provides greater retention of the retainer clip 80 on the rod 60 as compared to the edge or finger type contact of the prior art clips.

The retainer clip 80 is disassembled from the rod 60 by the application of simultaneous dual directional forces as follows. A suitable tool (not shown), such as standard spanner pliers, is inserted into the matably aligned semicircular wall grooves 122 in the tubular wall 102 as easily enabled by the radial alignment of the wall grooves 122 with the first annular groove 72 on the rod 60. The tubular wall 102 is expanded radially outward by the circumferential force of the pliers on the wall grooves 122 until the inner surface 104 Of the tubular wall 102 has a passageway diameter 107 greater than the end diameter 63 after which the retainer clip 80 is forced axially outward for removal over the rod end portion 62 for disassembly from the rod 60.

This invention advantageously provides a retainer clip 80 that easily snap-fits onto the rod 60 for ease of assembly. The assembled retainer clip 80 is radially and axially trapped on the reduced diameter portion 70 of the rod 60 to prevent axial removal of the retainer clip 80 from the rod 60 by application of only an axial force. However, disassembly for serviceability is permitted by simultaneous application of both a circumferential and axial force to the retainer clip 80. It will be appreciated that the retainer clip 80 may also be used with a rotating rod.

Advantageously, the retainer clip 80 has a retainer portion 100 and a washer portion 82 connected by a hinge portion 78 and formed from a single blank 150 of resilient material for handling as a single part during assembly without the need for a separate washer. Also advantageously, the entire retainer clip 80 including the spring legs 94 is generally cylindrical to minimize size and to prevent engagement with surrounding objects. Also advantageously, the axially extending tubular wall 102 of the retainer portion 100 dually secures the retainer clip 80 to the rod 60 by being axially trapped on the reduced diameter portion 70 of the rod 60 and by the snap-fitted radial engagement of the inner surface 104 of the tubular wall 102 with the reduced diameter portion 70.

Figure 9:
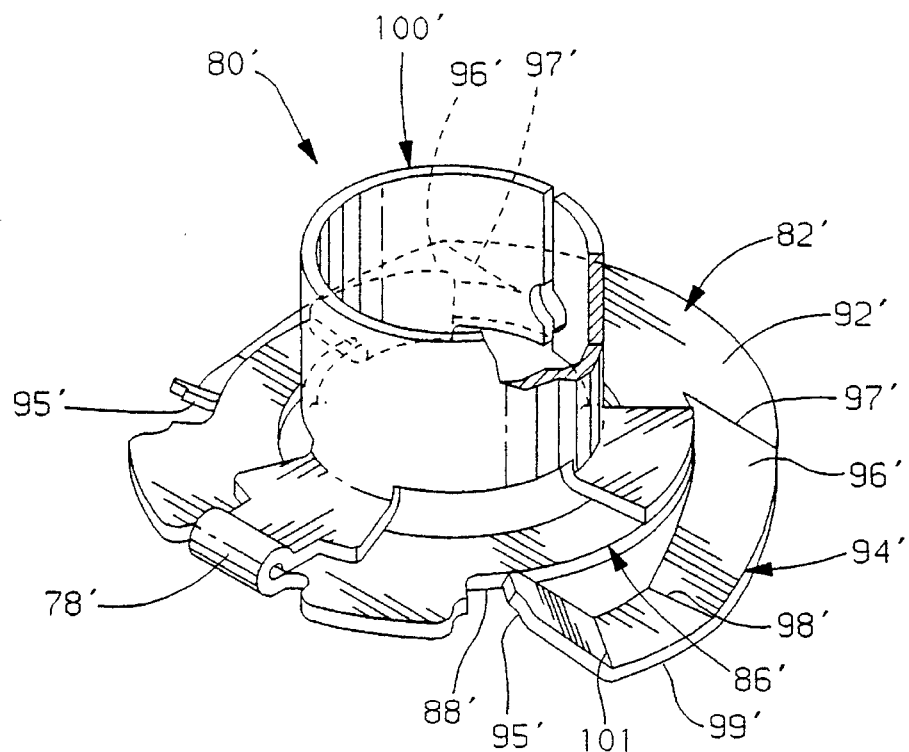
FIG. 9 is a perspective view similar to FIG. 5, but showing an alternate embodiment of the retainer clip partially-broken-away.
Figure 10:
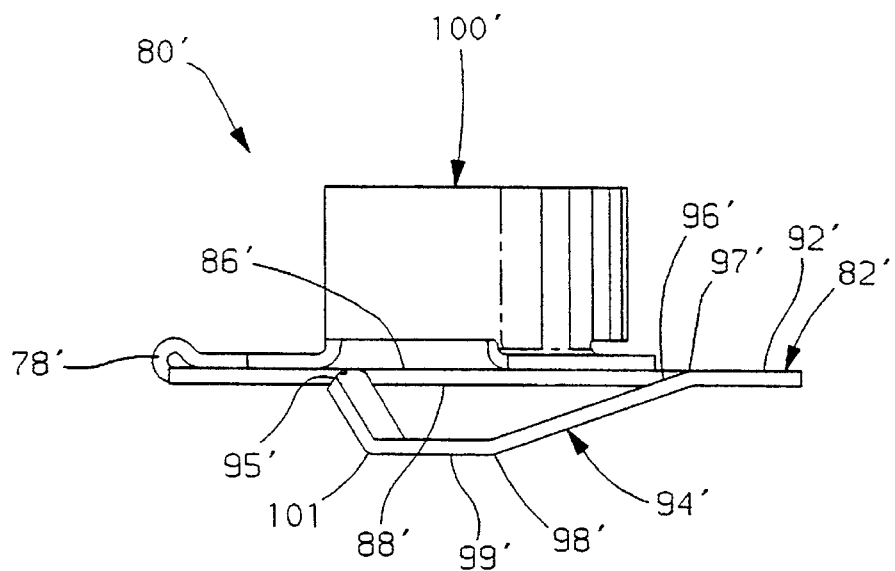
FIG. 10 is a side view of the retainer clip of FIG. 9.

Although the present invention has been described in considerable detail with reference to the preferred embodiment of FIGS. 3–8, other embodiments are possible. For example, FIGS. 9 and 10 show an alternate retainer clip 80' having similar features denoted by similar numerals. The retainer 80' includes a washer portion 82' and a retainer portion 100' integrally connected by a hinge portion 78'. The washer portion 82' has a generally cylindrical radially outward outer peripheral portion 92' and a plurality of flexible spring legs 94' which extend axially inward from the outer peripheral portion 92' of the washer portion 82'. The flexible spring legs 94' each have a free end 95' and a tip 96' opposite the free end 95' with the tips 96' being integrally connected to the outer peripheral portion 92' of the washer portion 82'. Each tip 96' includes a tip line bend 97' in a direction away from a second surface 88' of an inner portion 86' of the washer portion 82'. In addition, each flexible spring leg 94' includes a first intermediate line bend 98' and a second intermediate line bend 101 both directed back towards the second surface 88' of the inner portion 86'. The free ends 95' of the spring legs 94' are bent to be near the second surface 88' to allow free movement of the spring legs 94' while preventing entanglement of the retainer clips 80' during shipping. In addition, the line bends 97', 98', 101 on the spring legs 94' cooperatively form a generally flat trapezoidal or triangular shaped surface 99' on each of the flexible spring legs 94' for providing a flat contact surface 99' which resiliently engages the switch assembly without interfering with or damaging the switch assembly.

It will be understood that a person skilled in the art may make modifications to the preferred embodiment shown herein within the scope and intent of the claims. For example, although only two flexible spring legs 94, 94' are shown, more than two spring legs are possible.

While the present invention has been described as carried out in specific embodiments thereof, it is not intended to be limited thereby but is intended to cover the invention broadly within the scope and spirit of the appended claims.

The embodiments of the invention in which an exclusive property or privilege is claimed are defined as follows:

1. A retainer clip for attachment to a rod having an axially outward rod end and a reduced diameter portion axially inward the rod end, the reduced diameter portion having a reduced diameter and an axial rod length, the retainer clip comprising:

a retainer portion including an axially extending tubular wall including an inner surface defining an axially extending passageway, the inner surface of the passageway having a passageway diameter sized smaller than the reduced diameter of the rod when the retainer portion is in a relaxed condition, the wall including an axially extending slit permitting radial expansion of the wall for snap-fitted radial engagement of the inner surface of the wall around the reduced diameter portion of the rod when the retainer clip is assembled to the rod, the wall having an axial wall length less than the axial rod length of the reduced diameter portion of the rod such that the retainer portion is axially trapped on the reduced diameter portion of the rod when assembled to the rod;

a radially extending washer portion positioned axially inward the retainer portion, the washer portion having a hole therethrough being axially aligned with the passageway and sized for receiving the rod end and the reduced diameter portion of the rod therethrough; and a hinge portion integrally connecting the washer portion and the retainer portion;

whereby the inner surface of the wall continually applies concentric inward radial forces against the reduced diameter portion of the rod to radially trap the retainer clip on the rod and prevent rotation of the retainer clip relative the rod and removal of the retainer clip from the rod requires simultaneous radial expansion of the wall and outward axial movement of the retainer clip.

2. The retainer clip of claim 1 wherein the retainer clip is made from a single flat blank of resilient material.

3. The retainer clip of claim 2 wherein the single flat blank includes an elongate strip and wherein the tubular wall is formed by bending the elongate strip.

4. The retainer clip of claim 1 wherein the washer portion includes a first surface and an opposite second surface and wherein the tubular wall of the retainer portion has an axially inward edge connected to the hinge portion and proximate the first surface of the washer portion and wherein the retainer portion includes a plurality of bent tabs extending radially outward from the axially inward edge of the tubular wall, each of the tabs having a mating surface engaging the first surface of the washer portion to axially position the retainer portion relative the washer portion.

5. The retainer clip of claim 4 wherein the tabs each have a radially inward edge integrally attached to the tubular wall and an opposite radially outward edge and wherein the radially outward edge is wider than the radially inward edge such that the tab has a trapezoidal shape.

6. The retainer clip of claim 1 wherein the washer portion has a plurality of flexible spring legs extending axially inward from the washer portion, the spring legs each having a tip integrally connected to washer portion.

7. The retainer clip of claim 6 wherein the washer portion including the spring legs is cylindrical.

8. The retainer clip of claim 1 wherein the hinge portion includes a 180 degree bend therein for enabling the axial alignment of the passageway of the retainer portion and the hole in the washer portion.

9. The retainer clip of claim 1 wherein the tubular wall has a first axial edge and a second axial edge cooperatively defining the slip and wherein the first and second axial edges each have a semicircular groove thereon for assisting with radial expansion of the tubular wall.

10. A rod and retainer clip assembly for axially retaining a component on a rod, the assembly comprising:

the rod including an axially outward rod end portion having a rod end diameter, an enlarged diameter portion spaced apart axially inward from the rod end portion and having an enlarged diameter, and a reduced diameter portion axially extending between the rod end portion and the enlarged diameter portion, the reduced diameter portion having a reduced diameter sized smaller than the end diameter and the enlarged diameter and having an axial rod length;

a resilient retainer clip including a retainer portion, the retainer portion including an axially extending tubular wall including an inner surface defining an axially extending passageway, the inner surface of the passageway having a passageway diameter sized smaller than the reduced diameter when the retainer portion is in a relaxed condition, the wall including an axially extending slit permitting radial expansion of the wall for snap-fitted radial engagement of the inner surface of the wall around the reduce diameter portion of the rod when the retainer clip is assembled to the rod, the wall having an axial wall length less than the axial rod length of the reduced diameter portion of the rod such that the wall is axially trapped in the reduced diameter portion of the rod when assembled to the rod;

the resilient retainer clip including a radially extending washer portion positioned axially inward the tubular retainer portion, the washer portion having a hole therethrough being axially aligned with the passageway and sized greater than the end diameter and the reduced diameter and smaller than the enlarged diameter to prevent axial movement of the retainer clip onto the enlarged diameter portion of the rod; and a hinge portion integrally connecting the washer portion and the retainer portion;

whereby the inner surface of the wall continually applies concentric inward radial forces against the reduced diameter portion of the rod to radially trap the retainer clip on the rod and prevent rotation of the retainer clip relative the rod and removal of the retainer clip from the rod requires simultaneous radial expansion of the wall and outward axial movement of the retainer clip.

11. The assembly of claim 10 wherein the retainer clip is made from a single flat blank of resilient material including an elongate strip and wherein the tubular wall is formed by bending the elongate strip.

12. The assembly of claim 10 wherein the washer portion of the retainer clip includes a first surface and an opposite second surface and wherein the tubular wall of the retainer portion has an axially inward edge connected to the hinge portion and proximate the first surface of the washer portion and wherein the retainer portion includes a plurality of bent tabs extending radially outward from the axially inward edge of the tubular wall, each of the tabs having a mating surface engaging the first surface of the washer portion to axially position the retainer portion relative the washer portion.

13. The retainer clip of claim 12 wherein the tabs each have a radially inward edge integrally attached to the tubular wall and an opposite radially outward edge and wherein the radially outward edge is wider than the radially inward edge such that the tab has a trapezoidal shape.

14. The assembly of claim 10 wherein the washer portion of the retainer clip includes a plurality of flexible spring legs extending axially inward for engaging the component, the spring legs each having a tip integrally connected to the washer portion.

15. The assembly of claim 10 wherein the hinge portion of the retainer clip includes a 180 degree bend therein for enabling the axial alignment of the passageway of the retainer portion and the hole in the washer portion.

16. The assembly of claim 10 wherein the rod includes radially extending, axially spaced apart and opposing first and second abutment surfaces adjacent the reduced diameter portion of the rod on the rod end portion and enlarged diameter portion, respectively, and wherein the tubular wall of the retainer is axially trapped between the first and second abutment surfaces when assembled to the rod.

17. The retainer clip of claim 10 wherein the tubular wall has a first axial edge and a second axial edge cooperatively defining the slit and wherein the first and second axial edges each have a semicircular groove thereon for assisting with radial expansion of the tubular wall.

18. A method of making a retainer clip comprising the steps of:

a) providing a flat blank of resilient material having a first surface and an opposite second surface;

b) stamping the blank to form a cylindrical washer portion, an elongate strip, and a hinge portion interconnecting the washer portion to the elongate strip;

c) providing a hole in the washer portion;

d) stamping an outer peripheral portion of the washer portion to form a plurality of flexible spring legs each having a tip connected to the washer portion;

e) bending the elongate strip into a tubular shape to provide an axially extending tubular wall having an axial passageway and an axially extending slit; and f) bending the hinge portion 180 degrees in a direction towards the first surface of the washer portion such that the passageway is axially aligned with the hole in the washer portion.

19. The method of claim 18 further characterized by providing the elongate strip with a plurality of tabs extending towards the washer portion and bending each of the tabs 90 degrees towards the second surface of the blank such that the tabs extend radially outward from the tubular wall portion.

* * * * *